US010962440B2

(12) United States Patent
 Vegetti (10) Patent No.: US 10,962,440 B2
(45) Date of Patent: Mar. 30, 2021

(54) VALVE OPERATOR INCLUDING A FUGITIVE EMISSIONS DETECTOR, AND A METHOD OF DETECTING FUGITIVE EMISSIONS FROM AN INDUSTRIAL VALVE

(71) Applicant: Rotork UK Limited, Bath (GB)

(72) Inventor: Simone Vegetti, Bath (GB)

(73) Assignee: Rotork UK Limited, Bath (GB)

( * ) Notice: Subject to any disclaimer, the term of this patent is extended or adjusted under 35 U.S.C. 154(b) by 179 days.

(21) Appl. No.: 16/085,244

(22) PCT Filed: Mar. 17, 2017

(86) PCT No.: PCT/GB2017/050753
§ 371 (c)(1),
(2) Date: Sep. 14, 2018

(87) PCT Pub. No.: WO2017/158380
PCT Pub. Date: Sep. 21, 2017

(65) Prior Publication Data
US 2019/0078965 A1    Mar. 14, 2019

(30) Foreign Application Priority Data

Mar. 18, 2016 (GB) ..................................... 1604656

(51) Int. Cl.
 *G01M 3/28* (2006.01)
 *F16K 37/00* (2006.01)
 *G01M 3/18* (2006.01)

(52) U.S. Cl.
 CPC ......... *G01M 3/2876* (2013.01); *F16K 37/005* (2013.01); *F16K 37/0083* (2013.01); *G01M 3/184* (2013.01); *G01M 3/2815* (2013.01)

(58) Field of Classification Search
 None
 See application file for complete search history.

(56) References Cited

U.S. PATENT DOCUMENTS 4,901,751 A    2/1990  Story et al.
4,972,867 A   11/1990  Ruesch
           (Continued)

FOREIGN PATENT DOCUMENTS

EP      0637713 A1    2/1995
JP    2009-115253 A    5/2009
           (Continued)

OTHER PUBLICATIONS

International Search Report and Written Opinion of PCT/GB2017/050753, dated Mar. 18, 2016 (9 pages).
           (Continued)

*Primary Examiner* — Lisa M Caputo
*Assistant Examiner* — Nigel H Plumb
(74) *Attorney, Agent, or Firm* — Michael Best & Friedrich LLP (57) ABSTRACT

A valve operator for a valve includes a valve operator housing defining at least one cavity and positioned to be at least partially contiguous with a valve stem passage of the valve. The cavity has a fixed volume and is sealed from the exterior environment. The valve operator includes a fugitive emissions detector having at least one sensor for measuring the pressure and temperature of the fluid within the interior of the cavity. The detector also includes a processor having an input for receiving data from the at least one sensor, a processing unit connected to the input to receive the data from the input and monitor changes in the amount of substance within the cavity by comparison of changes in temperature and pressure within the cavity and an output for providing an indication of fugitive emissions when the processor indicates an increase in substance within the cavity.

15 Claims, 3 Drawing Sheets

(56) References Cited

U.S. PATENT DOCUMENTS

| | | |
|---|---|---|
| 5,203,370 A | 4/1993 | Block et al. |
| 5,616,829 A | 4/1997 | Balaschak et al. |
| 6,050,296 A | 4/2000 | Hoffmann et al. |
| 2015/0041000 A1 | 2/2015 | Smart et al. |

FOREIGN PATENT DOCUMENTS

| | | |
|---|---|---|
| JP | 2011-51382 A | 4/2011 |
| RU | 2493467 C2 | 9/2013 |

OTHER PUBLICATIONS

GB1604656.7 UK IPO Search Report dated Nov. 29, 2016 (2 pages).
Japanese Patent Office Action for corresponding application No. 2019-500031, dated Oct. 29, 2019 (5 pages).
English translation of Russian Patent Office Action for corresponding application No. 2018135855, dated Aug. 21, 2019 (3 pages).

VALVE OPERATOR INCLUDING A FUGITIVE EMISSIONS DETECTOR, AND A METHOD OF DETECTING FUGITIVE EMISSIONS FROM AN INDUSTRIAL VALVE

FIELD OF THE INVENTION

This invention relates to a method and apparatus for fugitive emission detection and in particularly, but not exclusively, to a fugitive emission detection arrangement for use industrial valves.

BACKGROUND TO THE INVENTION

Industrial valves are very widely used globally to control the flow of fluids in manufacturing, civil services and other industries. For example, industrial valves may be used oil and gas, water and waste water, power, marine, mining, food, pharmaceutical and chemical industries. Industrial valves must be designed to minimise leakage. In particular as valves by their nature, necessitate some non-static seals they will present a potential leak location in any industrial flow system. Valve manufactures are constantly improving their products to reduce the risk but this cannot eliminate all risk of leakage. Such Leakage may lead to loss of profit/revenue, increased maintenance costs, increased process risk/risk to operators, risk of contamination (to the environment) and/or risk of contamination (to the fluid/product).

These risks can be mitigated by implementing control methods in accordance with the principles of fugitive emissions control. According to numerous regional directive/regulations the suggested approach and/or best practice to fugitive emissions control by order of priority is as follows:
  i. Prevention by the selection of non-leaking or leak-tight equipment,
  ii. Monitoring for the detection of leaks,
  iii. Reparation of leaks as promptly as possible,
  iv. Continuous upgrading of leak prevention achievements.

The present invention is directly intended to address the second issue, namely the monitoring and detection of leaks. This is commonly referred to in the art as "fugitive emission detection". It will, however, be appreciated that the third and fourth principles are directly impacted by the execution of the fugitive emission control and detection. As such, the skilled person would appreciate that an effective fugitive emission detection system could have a profound impact on the broader fugitive emission control processes.

There are a number of existing approaches which are currently in use and/or commercially available for fugitive emission detection.

Some techniques rely upon manual, labour intensive, detection. For example: Audible Noise detection in which an operator/inspector listening for unusual noises from equipment; the use of Gas Leak Spray in which a suspected leak area is sprayed with a spray and resulting in visible gas bubbles when a leak is present; or traditional valve isolation and inspection in which the valve is isolated and manually inspected (possibly as part of a preventative maintenance programme). Clearly these methods are labour intensive (often requiring specialist skilled labour), of limited accuracy and time consuming.

Accordingly, there have been various developments which seek to automate or assist in the field of fugitive emission detection.

Gas Leak Detection Devices are available which may be handheld or worn by inspection personnel and measures the environment and emits an alarm upon sensing emissions. Inspections using such "sniffer" devices may be carried out at fixed intervals (with the intervals being determined based upon safety). Typically such devices are focused on the detection of dangerous levels of a volatile gas which could be harmful to the user.

One of the more common systems is to use Infrared Temperature measurement tools. These tools measure and compare temperature values upstream and downstream of the valve. The Joule-Thomson effect states that both upstream and downstream temperatures must be equal; as such discrepancies between these values may be an indicator of fugitive emissions. However, not all leaks can be detected by this method (some leaks do not cause a measurable temperature differential). Further the external temperature readings of pipelines and fittings can be influenced by other external factors which may result in a loss of accuracy or even the ability to detect changes related to leaks altogether.

A further detection system is Acoustic Emissions which utilises an indirect measure of turbulence within the valve (for example via a piezoelectric device) and can determine leakage based upon variations in the turbulence. Such systems only provide an indirect indication of leakage and require extensive tailoring to a particular valve. For example a large database of empirical data is needed to support the detection of changes and many variables in the detection need specific, detailed, knowledge of the particular valve and flow conditions.

Finally, Ultrasonic Stethoscopes may be used to pass an ultrasonic wave through the valve to find possible leak paths. The efficiency of this method is currently unconfirmed. However, there are clear limitation/difficulties to this approach since listening frequency must be very carefully selected to filter out nearby noise. Accordingly, the use of Ultrasonic Stethoscopes requires a specifically trained and skilled operator.

Thus, it will be appreciated that there remains a desire to provide an emission detection method and/or apparatus for assisting and/or automating fugitive emission detection, particularly fugitive emissions associated with valves. At least some embodiments of the present invention are intended to provide an alternative emission detection system which may address at least some of the disadvantages of some of the above described methods.

SUMMARY OF THE INVENTION

In accordance with an embodiment of the invention there is provided a valve operator for a valve, the valve operator comprising:
  a valve operator housing comprising:
    at least one cavity defined within the valve operator housing and positioned to be at least partially contiguous, in use, with a valve stem passage of the valve, the cavity having a fixed volume and being sealed from the exterior environment; and
  the valve operator further comprising a fugitive emissions detector, the detector comprising:
    at least one sensor for measuring the pressure and temperature of the fluid within the interior of the cavity; and
    a processor comprising:
      an input for receiving data from the at least one sensor;
      a processing unit communicably connected to the input and configured to receive the data from the input and monitor changes in the amount of substance within the cavity by comparison of changes in temperature and pressure within the cavity;

and an output for providing an indication of fugitive emissions when the processor indicates an increase in substance within the cavity.

In accordance with an embodiment of the invention there is provided a valve comprising;
a valve actuation stem for moving the valve member in use; and
a housing, at least partially enclosing the valve, and including a portion defining a valve stem passage; the valve further comprising:
at least one cavity defined within the housing and positioned to be at least partially contiguous, in use, with the valve stem passage, the cavity having a fixed volume and being sealed from the exterior environment; and
the valve further comprising a fugitive emissions detector, the detector comprising:
at least one sensor for measuring the pressure and temperature of the fluid within the interior of the cavity; and
a processor comprising:
an input for receiving data from the at least one sensor;
a processing unit communicably connected to the input and configured to receive the data from the input and monitor changes in the amount of substance within the cavity by comparison of changes in temperature and pressure within the cavity; and
an output for providing an indication of fugitive emissions when the processor indicates an increase in substance within the cavity.

Accordingly to an aspect of the invention, there is provided an industrial valve operator having an integrated valve fugitive emission detection arrangement.

It may be appreciated that in the context of the invention an integrated fugitive emissions detection arrangement comprises the detector being at least partially integrated into the valve operator but the detector may optionally be integrated into a control/monitoring network. In some embodiments a local processing unit may be provided with/at the valve operator. Alternatively, a remote processor (for example a computer shared by a plurality of devices) may be utilised with the processor receiving data over a network.

According to a further aspect of the invention, there is provided a valve operator for a valve, the valve operator comprising:
a valve operator housing comprising:
at least one cavity defined within the valve operator housing and positioned to be at least partially contiguous, in use, with a valve stem passage of the valve,
a sealing face configured, in use, to sealing engage a flange, the flange being provided on the valve and surrounding the valve stem passage, so as to isolate the cavity, or cavities, from the external environment when mounted to the flange;
and wherein the valve operator further comprises at least one sensor for monitoring the gas conditions in the cavity.

Accordingly, the valve operator may include an integrated fugitive emissions detection arrangement.

The valve may be an industrial valve.

Accordingly embodiments of the invention may provide a valve operator having an integrated valve fugitive emission detection arrangement.

The valve operator may be any known type of valve operator device which, the skilled person will appreciate would ordinarily be attached to an industrial valve to engage the valve stem and provide a means for controlling and actuating the valve in use. For example, the simplest form of valve operator may be a simple actuation lever or handwheel. Alternatively the operator could be a valve actuator, for example the valve operator could be any of an electric, Pneumatic or Hydraulic actuator. The valve operator may also be an intermediate component in a valve actuation system, for example a gearbox or adaptor. Such intermediate components may be attached to an industrial valve (to engage the valve stem) and then in turn be connected to a valve actuator or the like.

The skilled person will be aware that various such valve operators are readily commercially available from Rotork PLC group of companies. Advantageously, embodiments of the invention may be easily incorporated into such known devices with only relatively minimal modification.

The invention is predicated, at least in part, on the Applicants' recognition that the static seals in the valve and/or valve operator are highly reliable (and can nominally be considered to be a perfect seal) whereas a rotating seal such as that provided at the valve stem is unavoidably less reliable (and, therefore, typically requires more regular maintenance and inspection). As such, it is possible to anticipate that the leak path of fugitive emissions from the valve will pass through the valve stem passage (and typically through the rotational seals provided across the passage to close the space between the stem and valve housing) to the valve operator, as the path of least resistance.

By providing a cavity which is at least partially contiguous, in use, with the valve stem passage, the cavity will receive any such fugitive emissions. Advantageously, embodiments of the invention allow monitoring/detection to be carried out at the valve operator, rather than at the valve itself, which will almost always be in a more convenient and/or readily accessible location. Even though embodiments may allow the detection to be carried out at a more convenient location it is also an advantage that, unlike many prior art methods (such as Infrared Temperature or Acoustic Emissions), embodiments of the invention enable direct testing of leaking fluid.

Furthermore, it will be appreciated that valve operators are generally easily replaced or upgraded (whereas the valve may be in a flow which needs continuous operation). For example valve operators may generally be configured for attachment onto standardised valve flanges. Thus, a valve operator in accordance with embodiments of the invention may readily be retrofitted to existing industrial valves.

In particular the at least one sensor may measure the temperature and pressure within the cavity. The at least one sensor may be provided internally to the valve operator. The at one least sensor may generally be direct in communication with the interior of the cavity.

It will be appreciated that the pressure and temperature in a volume are related directly to the amount of substance present within the volume (as expressed in the ideal gas law). The volume of the cavity in the valve operator is known. Further, the volume is typically constant. Measurement of the pressure and temperature can be used to provide an indication of any change in the amount of substance within the cavity. As the cavity is generally sealed when installed on a valve (other than being at least partially contiguous with a valve stem passage of the industrial valve) any change detected in the cavity can be assumed to have escaped from the valve stem housing (i.e. having leaked past a valve stem seal). Thus, the detection of a change in the cavity may be used as a direct measure indicative of fugitive emissions from the valve.

In order to ensure that the effective volume of the cavity remains constant it is important to ensure a good seal between the cavity and the exterior whilst keeping the cavity in fluid communication with the leak path from the valve stem passage. This seal is provided by engagement between a flange of the valve and the sealing face of the valve operator. The sealing face of the valve operator may include at least one resilient sealing member, for example an O-ring. The resilient seal member may be compressed between opposing portions of the flange and sealing face in use to provide an effective seal.

A fugitive emissions detection arrangement in accordance with some embodiments of the invention may only be required to detect a change in the amount (generally an increase) of substance in the chamber (to detect a leak) rather than determine the actual quantity of any such change. This may simplify the implementation of the embodiment since, if the volume of the cavity is constant, it is not necessary to know or measure the actual cavity volume. This may for example, advantageously eliminate any errors or calibration required due to tolerances in manufacturing.

The cavity may be provided with an overpressure vent outlet. The vent outlet may ensure that the fluid pressure within the cavity cannot exceed a predetermined nominal safe pressure value. If the pressure exceeds the nominal safe pressure value the overpressure vent outlet will allow fluid from the cavity to be vented to the external atmosphere. The predetermined nominal safe pressure may be selected to be sufficiently low to ensure that damage will not occur to the valve operator. The predetermined nominal safe pressure value may be selected to be in excess of the sensitivity of the fugitive emissions detection. As such, in normal operation any fugitive emissions would be expected to be detected by the system in advance of the need for the system to vent (and action may be possible to prevent the emissions prior to the pressure in the housing reaching the nominal safe pressure). The overpressure vent outlet may for example comprise a valve or burst diaphragm to allow venting when the selected nominal safe pressure is reached or exceeded.

The valve operator may further comprise a processor for receiving data from the at least one sensor and for determining whether they are indicative of fugitive emissions. The processor may be local to the valve operator or could be remotely located (for example as part of a networked system). Locating the processor locally may advantageously allow the system to provide a local indication of the detection of fugitive emissions (for example in addition to sending a signal to a monitoring or control system such that redundancy is provided).

The processor may for example be arranged to receive pressure and temperature measurements relating to the cavity from the at least one sensor and determine whether any change in substance within the cavity has occurred. The processor may for example be configured to determine a change by calculating:

$$\frac{\Delta n}{n} = \frac{P_1 T_0}{P_0 T_1} - 1$$

Where:

$$\frac{\Delta n}{n}$$

is the proportional change in the number of moles;
$P_0$ is the original cavity pressure (i.e. a datum pressure);
$P_1$ is the current (measured) cavity pressure;
$T_0$ is the original cavity temperature (i.e. a datum temperature); and
$T_1$ is the current cavity temperature.

The processor may provide an indication of fugitive emissions if $$\frac{\Delta n}{n} > 0.$$

The values of $P_0$ and $T_0$ may be recorded by the processor when the device is re-set. For example a re-set button or function may be provided which causes the process to record sense values as the datum value for both pressure and temperature.

The valve operator may be provided with a network module (for example a receiver/transmitter connected to a processor). This may for example allow integration of the fugitive emissions detection into a control or monitoring network. The network transmitter could for example be configured to be connected into a conventional wired or wireless field network. For example, the network transmitter could be arranged to be compatible with the Pakscan system available from Rotork.

Providing networked fugitive emissions detection arrangements may advantageously allow for live and continuous monitoring. Further, the system may reduce fugitive emissions to the environment by providing prompt notification or flagging of any valve errors.

Accordingly, a further embodiment of the invention provides a valve monitoring system comprising a plurality of valve operators each associated with one of a corresponding plurality of valves, wherein each valve operator is provided with an integral fugitive emissions detection arrangement.

The valve monitoring system may include a wired or wireless network. The valve monitoring system may include a central controller.

For example, each valve operator may comprise a valve operator in accordance with embodiments of the invention.

The valve operator in embodiments of the invention may include additional sensor devices for detecting the operational status of the valve and/or valve operator. For example, a position indicator could be provided to determine the stroke position of the valve. This information may be integrated with the monitored data from the position sensors (for example in the processor). This may enable the data from the fugitive emissions detection to be utilised for additional diagnostic purposes. For example, a monitoring or control system may be able to utilise the position sensor information along with fugitive emissions detection to correlate the stage/position of the valve operation at which emissions are occurring.

The valve operator housing defining the housing may at least partially house the components of the valve operator. For example it may be a cast housing. The housing may for example be a housing meeting a required environmental sealing standard.

According to a further aspect of the invention there is provided a valve actuator comprising:

a motor for rotating the drive shaft in use;
an output driven by the drive shaft and arranged for driving the valve stem of a valve in use; and
a valve actuator housing comprising:
at least one cavity defined within the valve actuator housing and positioned to be at least partially contiguous, in use, with a valve stem passage of the valve,
a sealing face configured, in use, to sealing engage a flange, the flange being provided on the valve and surrounding the valve stem passage, so as to isolate the cavity, or cavities, from the external environment when mounted to the flange;
and wherein the valve actuator further comprises at least one sensor for monitoring the gas conditions in the cavity.

The output may comprise a gear. The gear may be driven by a worm associated with the drive shaft.

According to a further aspect of the invention there is provided a valve assembly including a valve and a valve operator as herein described.

The skilled person will appreciate that, although it may be less commercially useful, the valve operator and valve could be integrally formed without altering the underlying principle of the integration of the fugitive emissions detection into the valve operator portion of the valve assembly.

According, in a further aspect the invention may provide a valve assembly comprising:
a valve including
a valve member
a valve actuation stem and
a housing, at least partially enclosing the valve, and including a portion defining a valve stem passage;
the valve further comprising:
at least one cavity defined within the housing, the cavity being isolated form the external environment and at least partially contiguous with the valve stem passage of the valve,
and wherein the valve further comprises at least one sensor for monitoring the gas conditions in the cavity.

The valve may comprise a valve stem seal which separates the cavity from the valve stem.

The housing at least partially enclosing the valve and the housing defining the at least one cavity may be integrally formed.

According to a further embodiment of the invention there is provided a method of providing a fugitive emissions detection arrangement for a valve, the method comprising:
providing a valve operator including an integral fugitive emissions detection;
sealingly connecting the valve operator to the valve such that the valve operator is in the leak path for fugitive emissions and
monitoring the fluid conditions within the valve operator to detecting fugitive emissions.

The method may be a method of retrofitting. Accordingly, the step of providing a valve operator may comprise the additional step of removing an existing valve operator.

The valve operator may, for example be a valve operator in accordance with any embodiment of the invention.

The method may further comprise connecting the valve operator to a control network.

The step of monitoring the fluid conditions may comprise monitoring changes in pressure and/or temperature within a portion of the valve operator to provide an indication of any fugitive emissions.

Whilst the invention has been described above with reference to a number of embodiments and aspects it is to be understood that it includes any inventive combination of the features set out above or in the following description or drawings.

DESCRIPTION OF THE DRAWINGS

A specific embodiment of the invention will now be described in detail, by way of example only, and with reference to the accompanying drawings in which.

DESCRIPTION OF AN EMBODIMENT

Figure 1:
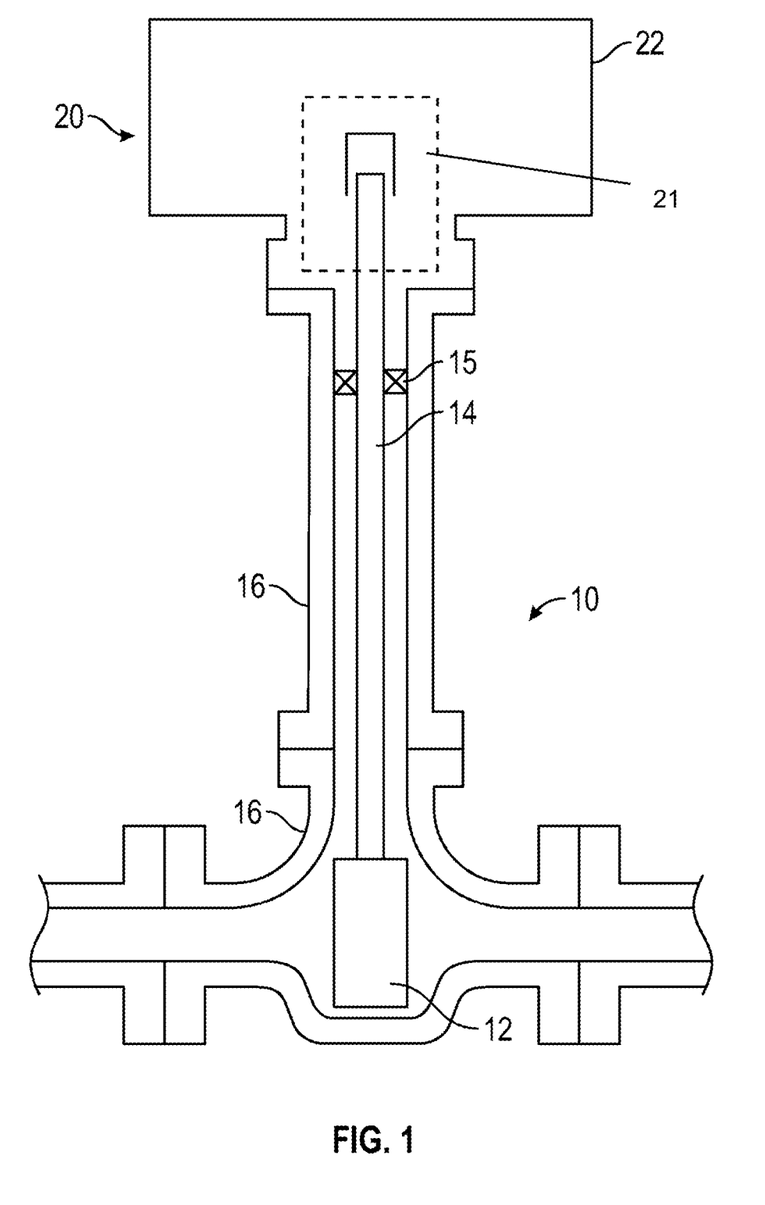
FIG. 1 schematically illustrating a valve and valve operator in accordance with an embodiment of the invention.

FIG. 1 shows a typical industrial valve assembly 10 which may be used to control the flow of fluids in industrial applications. For example, the valve assembly 10 could be used oil and gas, water and waste water, power, marine, mining, food, pharmaceutical and chemical industries. The valve assembly comprises a valve having a valve member 12 connected to a valve actuation stem 14. The valve could for example be a quarter turn valve or a multi-turn valve arrangement.

The valve member 12 and stem 14 are provided within a housing 16. The upper portion of the housing 16 comprises a valve stem passage 17 and terminates at a flange 18. At least one stem seal 15 is provided between the stem passage 17 and stem 14 and is intended to prevent the escape of fluid from the valve housing 16 in use. As the stem seal 15 is a non-static seal (as the stem 14 will generally rotate relative to the passage 17 during actuation) it provides a less reliable seal than static seals (for example those between the valve housing and the associated pipe or conduit. Thus, when a leakage occurs at the valve the stem seal 15 is the path of least resistance and fugitive emissions will be expected to pass beyond the seal 15 and out of the stem passage 17.

The valve assembly 10 also includes a valve operator 20. The valve operator 20 drivingly engages an upper drive portion of the valve stem 14 and provides a means for controlling and actuating the valve member 12 in use. The valve operator 20 is provided within a valve operator housing 22 which is arranged to be connected to the valve housing 16 via the flange 18. The box designated 21 defines a motor for rotating a driveshaft in use and an output driven by the driveshaft and arranged for driving the valve stem 14 in use. The output comprises a gear, which may for example be driven by a worm associated with the driveshaft. In its simplest form the valve operator could be a manual operator such as a hand-wheel (which may include an associated gearing arrangement). In the example of FIG. 1 the valve operator represents an electrical valve actuator (for example one of the IQ actuator range available form Rotork Controls Limited). In some embodiments the valve operator may also be an intermediate component in a valve actuation system; for example a gearbox or adaptor which is connected to the valve flange 18 to drivingly engage the stem 14 but which in turn receives a further actuator to power and or control the intermediate component.

Figure 2:
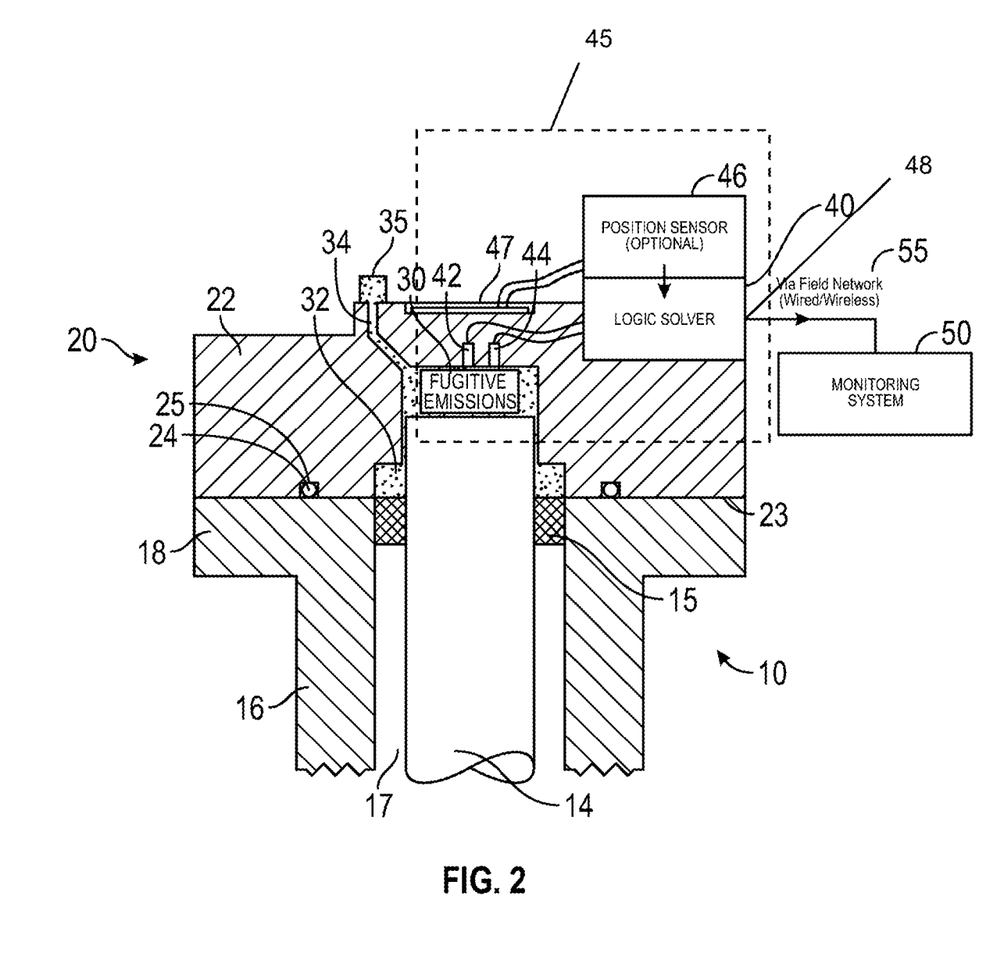
FIG. 2 schematically illustrates a cross sectional view of a fugitive emission detection arrangement provided in a valve operator in accordance with an embodiment of the invention.

As best seen in the schematic partial cross section of FIG. 2, in accordance with embodiments of the invention, the valve operator 20 is provided with an integral fugitive emissions detection arrangement 45 (the components and operation of which will be described below).

The valve operator 20 is connected to the valve flange 18 in any conventional manner. The mating surface of the valve operator housing 22 provides a sealing face 23 which abuts the corresponding upper face of the valve flange. The sealing face is provided with at least one sealing member 24, for example an O-ring received in a recess 25. With the valve operator 20 mounted on the valve housing 16, the sealing arrangement effectively forms a seal around the upper end of the valve stem passage 17.

The valve operator 20 is provided with a cavity 30 which is defined within the interior of the housing 22. The cavity 30 may have any convenient shape or profile. The cavity 30 shape will depend upon the particular valve operator 20 and may for example be formed of a plurality of interlinked sub-cavities or chambers. However, regardless of the particular profile, at least a portion 32 of the cavity 30 must be contiguous with the valve stem passage 17 when the valve operator has been installed on the valve. Due to the sealing around flange 18 and the sealing surface 23 (which is a static seal so can be considered to allow a nominally perfect seal), the cavity 30 defined by the housing 22 is the only outlet (via the contiguous portion 32) from the stem passage 17 if fugitive emissions escape beyond the stem seal 15.

To prevent dangerous pressure levels developing within the cavity 30, an overpressure outlet 34 is provided to enable venting of the, normally sealed, cavity 30 to the external atmosphere. A pressure controller 35 such as a valve or rupture diaphragm closes the overpressure outlet 34 during normal operation such that venting only occurs at a predetermined pressure based upon a nominal safety value for the pressure within the housing 22 of the operator 20. The operation of the fugitive emissions arrangement will, during normal operation, be unaffected by the presence of the overpressure outlet 34 as the sensitivity of the fugitive emissions detection can be selected to be significantly below the level of fugitive emissions which would be required to result in an overpressure situation.

A temperature 42 and pressure 44 sensor are provided within the valve operator 20 and configured to allow direct monitoring of the fluid within the cavity 30. The temperature 42 and pressure 44 sensors provide information on the conditions within the cavity 30 to a processor 40 (which may for example be a logic solver). In the illustrated embodiment the processor 40 is locally provided integral to the valve operator 20. It will, however, be appreciated that alternatively raw data could be transmitted to a remote control or monitoring location which could include the processor. The valve operator may optionally be provided with additional status sensors such as a valve position sensor 46, which may be connected to an encoder device 47.

To allow for monitoring of multiple valve devices, and preferable live and continuous monitoring, the processor 40 may be provided with a network module or transmitter 48 to interface with a remote monitoring system 50. For example the processor may connect via a field network 55 which could be either a wired or wireless system.

Once the valve operator 20 in accordance with an embodiment has been installed on a valve the pressure and temperature information provided by the sensors 42, 44 may be utilised by the processor 40 to detect fugitive emissions.

The processor utilises the Ideal Gas Law:

$$PV = nRT$$

Where:
P Pressure (Pa)
V Volume (m3)
n Chemical Amount (mol)
R Ideal Gas Constant
T Temperature (K)

On the valve operator 20, the Volume V of the cavity 30 is constant. Further, the fugitive emissions detection is only required to determine a proportional change in the number of moles (i.e. not the absolute number) in order to detect a leak. Thus, the following equation can be derived:

$$\frac{\Delta n}{n} = \frac{P_1 T_0}{P_0 T_1} - 1$$

Where:

$$\frac{\Delta n}{n}$$

is the proportional change in the number of moles;
$P_0$ is the original cavity pressure (i.e. a datum pressure);
$P_1$ is the current (measured) cavity pressure;
$T_0$ is the original cavity temperature (i.e. a datum temperature); and
$T_1$ is the current cavity temperature.
if $$\frac{\Delta n}{n} = 0,$$

there is no leak.

As a result, the processor 40 may calculate any proportional change in n within the cavity 30 using the readings for P and T provided by the sensors 42 and 44 within the valve operator 20. As the cavity is sealed in normal operation, any detected change in n will be indicative of fugitive emissions entering the cavity 30 from the valve stem passage 17.

It is important to note that by assuming the volume of the cavity is constant the implementation of embodiments of the invention on different valve and valve operators is greatly simplified since the processor 40 need only measure changes in pressure and temperature.

Figure 3:
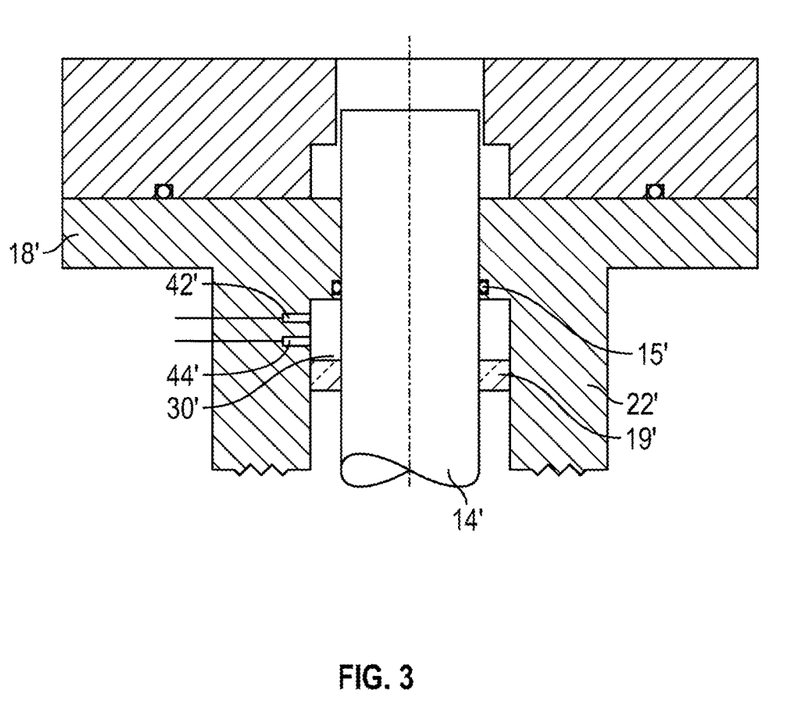
FIG. 3 schematically illustrates a cross sectional view of a fugitive emission detection arrangement provided in a valve operator in accordance with an alternative embodiment of the invention.

An alternate embodiment of the invention is shown in FIG. 3. In this embodiment the cavity 30' is formed below the flange 18' by providing a pair of spaced apart sealing arrangements on the shaft 14'. It will be appreciated that the shaft 14' may be an output extending from an actuator and connected in use to the valve stem. The shaft 14' may be integral with the valve stem. The skilled person will appreciate that the shaft 14' may be considered to be a valve operator in the context of the present invention.

The shaft 14' is contained within a shaft housing 22' which is contiguous with the valve stem passage of the valve. A cavity 30' is formed around the shaft 14' by the shaft housing 22' and a pair of sealing elements spaced axially apart along the length of the shaft 14'. In the illustrated embodiment the sealing elements comprise a primary seal formed by a pack 19' and a secondary seal (which may be a conventional shaft seal) 15'. The pack 19' is positioned below the shaft seal 15', but it will be appreciated that depending upon the particular arrangement of the housing 22' and shaft 14' the order/type of seals may be reversed. Thus an annular cavity 30' having a fixed volume is defined between the shaft 14', housing 22' and seals 15' and 19'.

Sensors 42' and 44' are provided and measure the temperature and pressure within the cavity 30' (although it will be appreciated that alternatively a single sensor may be arranged to sense both pressure and temperature). Data from the sensor(s) relating to pressure and temperature of within the chamber is provided to a processor as in the preceding embodiment and the change in pressure and change in temperature may be used to indicate a change in the substance (i.e. the amount of fluid) within the cavity and provide an indication of fugitive emissions.

It will be appreciated that other features of the first embodiment may be incorporated into the second embodiment without departing from the scope of the invention. For example the cavity 30' may be provided with an overpressure vent to allow for controlled evacuation in the event of excess fugitive emissions. Further it will be appreciated that the housing 22' may be either formed integrally with the valve housing or may be attached to the housing in any convenient manner (with appropriate sealing provided).

It will be appreciated from the above description that embodiments of the invention may provide an advantageous arrangement in which the valve operator include an integrated fugitive emissions detection arrangement. Advantages of embodiments may include one or more of the following:

No labour input being required after commission—information is relayed via a field network (wired or wireless) to appropriate personnel. This information will be live and continuous.

Direct detection of leaking fluid.

Embodiments may be used as a diagnostic tool which can lead to improved and more effective asset management.

Embodiments may aid in reducing volume of fluid released to the environment by fugitive emissions via prompt notification to appropriate personnel. This could lead to significant reductions in the severity of any leaks and the timely repair or replacement of leaking equipment.

The detection does not rely on previous empirical data.

Minimises the need for preventative maintenance.

Does not require specific knowledge of the valve.

Not affected by external noise.

Can be used for a variety of fluids.

Does not interfere with valve operation (i.e. has no effect on the production process).

Although the invention has been described above with reference to a preferred embodiment, it will be appreciated that various changes or modifications may be made without departing from the scope of the invention as defined in the appended claims. For example, whilst the described embodiment utilises a single cavity to detect fugitive emissions, the skilled person could readily envisage that in a system requiring redundancy it may be possible to define a plurality of cavities and to apply the methodology of the invention to each cavity independently.

The invention claimed is:

1. A valve operator for a valve, the valve operator comprising:
   a valve operator housing including:
      at least one cavity defined within the valve operator housing and positioned to be at least partially contiguous, in use, with a valve stem passage of the valve, the cavity having a fixed volume and being sealed from the exterior environment; and
   a fugitive emissions detection arrangement, the arrangement including
      at least one sensor for measuring a pressure and temperature of any fluid within the interior of the cavity; and
      a processor including
      an input for receiving data from the at least one sensor;
      the processor being communicably connected to the input and configured to receive the data from the input and monitor the proportional change in the number of moles within the cavity by comparison of changes in temperature and pressure within the cavity;
      and an output for providing an indication of fugitive emissions when the processor indicates an increase in the number of moles within the cavity,
      wherein the processor determines the proportional change in the number of moles within the cavity by calculating:

$$\frac{\Delta n}{n} = \frac{P_1 T_0}{P_0 T_1} - 1$$

wherein $$\frac{\Delta n}{n}$$

is the proportional change in the number of moles;
$P_0$ is the original measured cavity pressure (datum pressure);
$P_1$ is the current measured cavity pressure;
$T_0$ is the original measured cavity temperature (datum temperature); and,
$T_1$ is the current measured cavity temperature;
and wherein:

$$\frac{\Delta n}{n} = 0$$

indicates no leak, and, $$\frac{\Delta n}{n} > 0$$

indicates the presence of fugitive emissions.

2. A valve operator as claimed in claim 1, wherein the valve is an industrial valve.

3. A valve operator as claimed in claim 1, wherein the at least one sensor is in direct communication with the interior of the cavity.

4. A valve operator as claimed in claim 1, wherein the at least one cavity is provided with an overpressure vent outlet.

5. A valve operator as claimed in claim 1, wherein the processor is local to the valve operator.

6. A valve operator as claimed in claim 1, wherein the valve operator further comprises a network module in the form of a transmitter connected to the processor to interface with a remote monitoring system.

7. A valve operator as claimed in claim 1, wherein the valve operator housing further comprises a sealing face configured, in use, to sealing engage a flange, the flange being provided on the valve and surrounding the valve stem passage, so as to isolate the cavity from the external environment when mounted to the flange.

8. A valve operator as claimed in claim 7, wherein the sealing face of the valve operator includes at least one resilient sealing member.

9. A valve operator as claimed in claim 1, wherein the processor is configured to determine a change by monitoring changes in pressure relative to changes of temperature within the cavity.

10. A valve operator as claimed in claim 1, further comprising additional sensor devices for detecting the operational status of the valve and/or valve operator.

11. A valve operator as claimed in claim 1, further comprising a motor for rotating a drive shaft in use and an output driven by the drive shaft and arranged for driving a valve stem of the valve in use.

12. A valve operator as claimed in claim 11, wherein the output comprises a gear, which may for example be driven by a worm associated with the drive shaft.

13. A valve monitoring system as claimed in claim 12, further comprising a wired or wireless network.

14. A method of detecting fugitive emissions from a valve, the method comprising:
   providing a housing, having a cavity with a fixed internal volume, the cavity being in fluid communication with a leak path from a valve stem passage of the valve,
   isolating the cavity from the external environment;
   using at least one sensor to measure a pressure and temperature of any fluid within the interior of the cavity; and
   monitoring for proportional changes in the number of moles in the cavity using the detected change in pressure and detected change in temperature within the cavity,
   wherein the step of monitoring the proportional charge in the number of moles in the cavity includes calculating:

$$\frac{\Delta n}{n} = \frac{P_1 T_0}{P_0 T_1} - 1$$

wherein $$\frac{\Delta n}{n}$$

is the proportional change in the number of moles;
$P_0$ is the original measured cavity pressure (datum pressure);
$P_1$ is the current measured cavity pressure;
$T_0$ is the original measured cavity temperature (datum temperature); and,
$T_1$ is the current measured cavity temperature;
and wherein:

$$\frac{\Delta n}{n} = 0$$

indicates no leak, and, $$\frac{\Delta n}{n} > 0$$

indicates the presence or fugitive emissions.

15. A valve comprising:
   a valve member;
   a valve actuation stem for moving the valve member in use; and
   a housing, at least partially enclosing the valve, and including a portion defining a valve stem passage;
   at least one cavity defined within the housing and positioned to be at least partially contiguous, in use, with the valve stem passage, the cavity having a fixed volume and being sealed from the exterior environment; and
   a fugitive emissions detection arrangement, the arrangement including
   at least one sensor for measuring a pressure and temperature of any fluid within the interior of the cavity; and
   a processor, the processor includes
      an input for receiving data from the at least one sensor;
      the processor being communicably connected to the input and configured to receive the data from the input and monitor the proportional change in the number of moles within the cavity by comparison of changes in temperature and pressure within the cavity; and
      an output for providing an indication of fugitive emissions when the processor indicates an increase in the number of moles within the cavity,
      wherein the processor determines the proportional change in the number of moles within the cavity by calculating:

$$\frac{\Delta n}{n} = \frac{P_1 T_0}{P_0 T_1} - 1$$

wherein $$\frac{\Delta n}{n}$$

is the proportional change in the number of moles;
$P_0$ is the original measured cavity pressure (datum pressure);
$P_1$ is the current measured cavity pressure;
$T_0$ is the original measured cavity temperature (datum temperature); and,
$T_1$ is the current measured cavity temperature;
and wherein:

$$\frac{\Delta n}{n} = 0$$

indicates no leak, and, $$\frac{\Delta n}{n} > 0$$

indicates the presence of fugitive emissions.

* * * * *